(12) United States Patent
Wang et al.

(10) Patent No.: US 7,379,625 B2
(45) Date of Patent: May 27, 2008

(54) EDGE DIRECTION BASED IMAGE INTERPOLATION METHOD

(75) Inventors: Xianglin Wang, Santa Ana, CA (US); Yeong-Taeg Kim, Irvine, CA (US)

(73) Assignee: Samsung Electronics Co., Ltd., Suwon (KR)

( * ) Notice: Subject to any disclaimer, the term of this patent is extended or adjusted under 35 U.S.C. 154(b) by 490 days.

(21) Appl. No.: 10/452,318

(22) Filed: May 30, 2003

(65) Prior Publication Data

US 2003/0206667 A1    Nov. 6, 2003

(51) Int. Cl.
*G06K 9/32* (2006.01)
*H04N 7/01* (2006.01)
*G09G 5/00* (2006.01)

(52) U.S. Cl. .................. 382/300; 382/199; 382/293; 348/441; 358/525; 345/606

(58) Field of Classification Search ............ 382/199, 382/293, 298–300; 348/441; 358/525; 708/290; 345/606–611
See application file for complete search history.

(56) References Cited

U.S. PATENT DOCUMENTS

| | | | | |
|---|---|---|---|---|
| 5,532,751 | A * | 7/1996 | Lui | 348/452 |
| 5,786,862 | A | 7/1998 | Kim | 348/448 |
| 5,936,676 | A * | 8/1999 | Ledinh et al. | 348/452 |
| 6,396,543 | B1 * | 5/2002 | Shin et al. | 348/452 |
| 6,614,484 | B1 * | 9/2003 | Lim et al. | 348/448 |
| 6,630,961 | B1 * | 10/2003 | Shin et al. | 348/448 |
| 6,731,342 | B2 * | 5/2004 | Shin et al. | 348/452 |
| 6,771,835 | B2 * | 8/2004 | Han et al. | 382/260 |
| 6,798,422 | B2 | 9/2004 | Wang | 345/611 |
| 6,810,156 | B1 * | 10/2004 | Itoh | 382/300 |
| 6,930,728 | B2 * | 8/2005 | Rhee | 348/448 |

(Continued)

OTHER PUBLICATIONS

Gerard De Haan, Erwin B. Bellers, "Deinterlacing-An Overview", Proceedings of the IEEE, Sep. 1998, pp. 1839-1857, vol. 86, No. 9.

*Primary Examiner*—Aaron W. Carter
(74) *Attorney, Agent, or Firm*—Kenneth L. Sherman, Esq.; Michael Zarrabian, Esq.; Myers Dawes Andras & Sherman, LLP

(57) ABSTRACT

A method for interpolating pixel data of an omitted line by use of pixel data from an interlaced scan, for de-interlacing an interlaced video image. Image edge direction is detected at the center position of every two neighboring scan lines in an interlaced scan. All the directions detected in a given field constitute an edge orientation map. Edge directions are filtered to remove false and unreliable edge directions from the edge orientation map. If an edge direction is removed, the vertical edge direction is used to replace that direction in the edge orientation map. For interpolating a new pixel at the center of two neighboring scan lines, the corresponding direction for that position is used as the interpolation direction to calculate the value of the new pixel. If the direction is vertical, a filter is used along the vertical direction to calculate the interpolation value. If the direction is non-vertical, and has an integer value, then interpolation is performed by taking the average of the two neighboring sample values along the direction. If the direction is non-vertical and has a non-integer value, then an interpolation value is calculated using a directional bilinear method.

18 Claims, 11 Drawing Sheets

U.S. PATENT DOCUMENTS

| | | | |
|---|---|---|---|
| 6,987,893 B2* | 1/2006 | Kim | 382/300 |
| 6,995,775 B2* | 2/2006 | Xavier | 345/606 |
| 6,999,099 B2* | 2/2006 | Xavier | 345/606 |
| 7,023,487 B1* | 4/2006 | Adams | 348/448 |
| 7,043,091 B2* | 5/2006 | Michel | 382/266 |
| 7,057,664 B2* | 6/2006 | Law et al. | 348/448 |
| 7,075,580 B2* | 7/2006 | Jiang | 348/448 |
| 2001/0008425 A1* | 7/2001 | Shin et al. | 348/452 |
| 2003/0076447 A1 | 4/2003 | Wang | 382/199 |
| 2003/0169275 A1* | 9/2003 | Guo | 345/609 |
| 2003/0218621 A1* | 11/2003 | Jiang | 345/698 |
| 2004/0090443 A1* | 5/2004 | Wang | 345/611 |
| 2004/0114833 A1* | 6/2004 | Jiang | 382/300 |
| 2005/0008248 A1* | 1/2005 | Wang | 382/260 |
| 2005/0129306 A1* | 6/2005 | Wang et al. | 382/156 |
| 2006/0176315 A1* | 8/2006 | Sellers | 345/606 |

* cited by examiner

EDGE DIRECTION BASED IMAGE INTERPOLATION METHOD

FIELD OF THE INVENTION

The present invention relates to image interpolation, and in particular, to detecting edge directions between two neighboring lines in an interlaced scan and interpolating an omitted line between the two lines along the detected edge directions.

BACKGROUND OF THE INVENTION

De-interlacing is a process for converting an interlaced scan into a non-interlaced scan. Such a function is necessary in digital TV systems where the input video may have many different video formats. If a digital TV monitor is non-interlaced and the input video is in an interlaced format, the video needs to be de-interlaced.

Detecting edge directions (orientations) between neighboring lines in an interlaced scan is important in de-interlacing. Along the edge direction, image pixels' luminance values remain constant or change gradually. However, across the edge direction, pixels' luminance values change sharply.

There are existing methods for image de-interlacing. Generally, these methods can be classified into three categories: spatial (or intra-field), temporal (or inter-field) and spatio-temporal. In a spatial method, only samples (i.e., pixels) in the same field are utilized to calculate a value for new pixels. In a temporal method, samples in the neighboring fields are used to calculate a value for the new pixels. In a spatio-temporal method, samples in both the current field and neighboring fields may be used to calculate a value for the new pixels. Recently, motion compensation is also being used for de-interlacing.

Among the various kinds of de-interlacing methods, the spatial method is the most fundamental one. When there is a large scene change in the video, temporal information may not be reliable for de-interlacing. In that case, the spatial method is usually used. In the motion compensation based de-interlacing, the spatial method is also used when a motion vector is not reliable. Therefore, good spatial de-interlacing is very important for the overall de-interlacing quality in a digital TV system.

The basic idea of a spatial de-interlacing method is to utilize the correlation among the neighboring samples around the position where a new pixel is to be interpolated. Generally, interpolation is performed by computing a weighted average of neighboring samples. However, one problem with this general type of spatial interpolation is the degradation of image edges, including serrate lines or blurred edges that may appear in the interpolated image.

One solution for the above problem is to perform interpolation along image edge direction. Such a method requires detection of image edge direction for each position to be interpolated. Then based on the edge direction, interpolation may be performed by computing a weighted average of neighboring samples along that direction.

Some methods have been proposed for interpolating image along edge direction. However, it is still a difficult and open issue how to effectively and accurately detecting the edge direction for each position to be interpolated. On one hand, the detection of edge directions must be accurate because a wrong edge direction may introduce obvious artifacts or errors into the interpolated image. On the other hand, the edge direction should be used effectively wherever it is available. Otherwise, if a good edge direction is not properly detected and used at a given position, interpolation at that position may cause degradation of the edge.

BRIEF SUMMARY OF THE INVENTION

The present invention addresses the above needs. An object of the present invention is to provide an edge direction based image interpolation method that can effectively detect and utilize edge direction information without introducing obvious artifacts in the interpolated image. According to such a method, image edge direction is detected at the center position of every two neighboring scan lines in an interlaced scan. All the directions detected in a given field constitute an edge orientation map. Edge directions are filtered to remove false and unreliable edge directions from the edge orientation map. If an edge direction is removed, the vertical edge direction is used to replace that direction in the edge orientation map.

For interpolating a new pixel at the center of two neighboring scan lines, the corresponding direction for that position is used as the interpolation direction to calculate the value of the new pixel. If the direction is vertical, a finite impulse response (FIR) filter is used along the vertical direction to calculate the interpolation value. If the direction is non-vertical, and has an integer value, then interpolation is performed by taking the average of the two neighboring sample values along the direction. If the direction is non-vertical and has a non-integer value, then an interpolation value is calculated using a directional bilinear method.

BRIEF DESCRIPTION OF THE DRAWINGS

These and other features, aspects and advantages of the present invention will become understood with reference to the following description, appended claims and accompanying figures where:

DETAILED DESCRIPTION OF THE INVENTION

Figure 1:
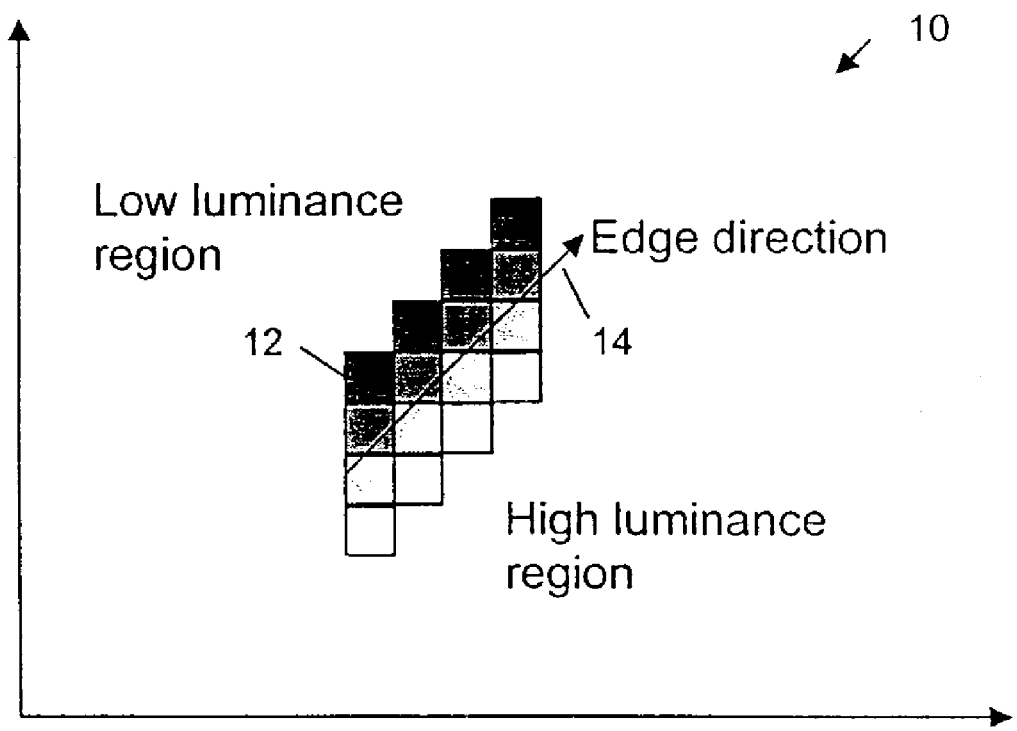
FIG. 1 shows an example of an edge direction.

While this invention is susceptible of embodiments in many different forms, there are shown in the drawings and will herein be described in detail, preferred embodiments of the invention with the understanding that the present disclosure is to be considered as an exemplification of the principles of the invention and is not intended to limit the broad aspects of the invention to the embodiments illustrated.

As noted above, in one embodiment the present invention provides an edge direction based image interpolation method, wherein image edge direction is detected at the center position of every two neighboring scan lines in an interlaced scan. All the directions detected in a given field constitute an edge orientation map. Edge directions are filtered to remove false and unreliable edge directions from the edge orientation map. If an edge direction is removed, the vertical edge direction is used to replace that direction in the edge orientation map.

For interpolating a new pixel at the center of two neighboring scan lines, the corresponding direction for that position is used as the interpolation direction to calculate the value of the new pixel. If the direction is vertical, a finite impulse response (FIR) filter is used along the vertical direction to calculate the interpolation value. If the direction is non-vertical, and has an integer value, then interpolation is performed by taking the average of the two neighboring sample values along the direction. If the direction is non-vertical and has a non-integer value, then an interpolation value is calculated using a directional bilinear method.

The present invention further provides a system for detecting edge directions between two neighboring lines in an interlaced scan and interpolating one omitted line at the center of the two neighboring scan lines based on detected edge directions. Through such kind of interpolation, the original interlaced scan can be converted into a non-interlaced scan without introducing obvious artifacts or degradation around image edge area.

FIG. 1 shows an example field 10 of pixels 12 showing an edge direction 14. Along the edge direction 14, pixels' luminance values remain constant or change gradually. Across the edge direction 14, pixels' luminance values change sharply.

Figure 2:
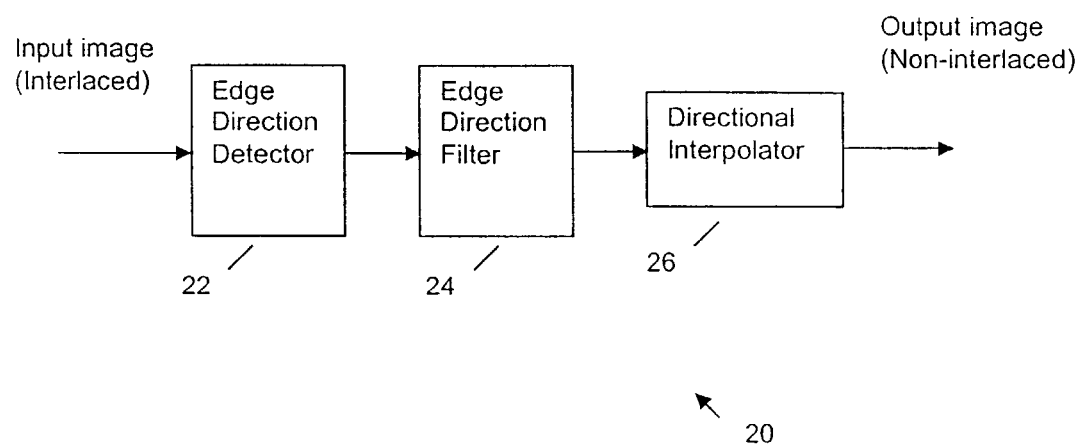
FIG. 2 shows a block diagram of an embodiment of a system for edge direction based interpolation according to the present invention.

Referring to FIG. 2, an example edge direction based interpolation system 20 according to the present invention comprises an edge direction detector 22, an edge direction filter 24 and a directional interpolator 26. The input to the system 20 is an interlaced image, and the output of the system 20 is the processed image that is converted to a non-interlaced format through interpolation.

Figure 3:
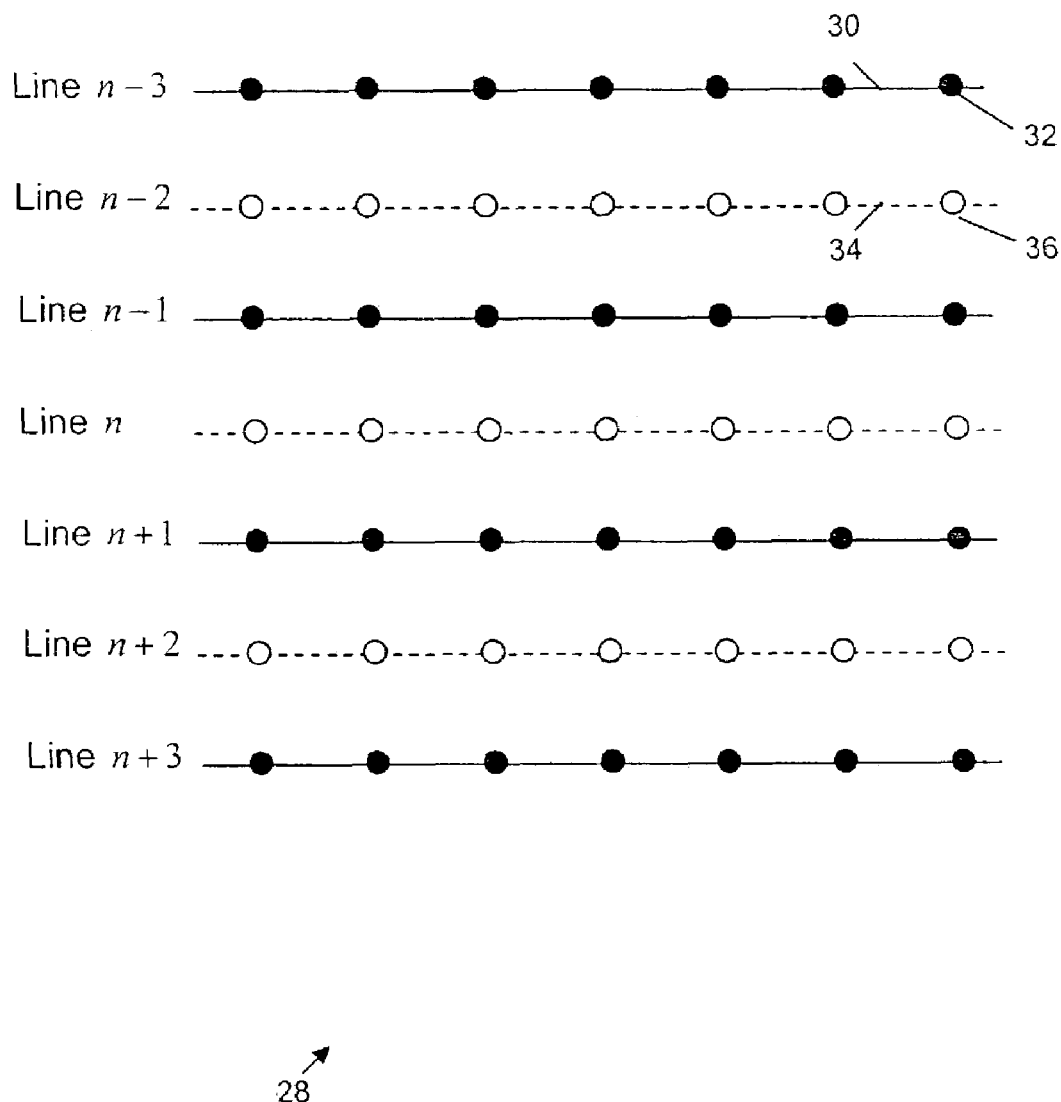
FIG. 3 shows a portion of an example image field and the positions where edge directions need to be detected.

FIG. 3 shows a portion of an example image field 28, wherein lines n−3, n−1, n+1 and n+3 are the original scan lines 30, and the solid dots 32 denote the original samples (pixels) in the field 28. The lines n−2, n and n+2 are omitted lines 34 in the field 28 which need to be interpolated. The hollow dots 36 denote the positions of new pixels to be interpolated. These new positions 36 are also the places where the edge direction detector 22 detects edge directions. In one example, the edge direction detector 22 detects edge directions at the center position between every two neighboring scan lines.

Figure 4:
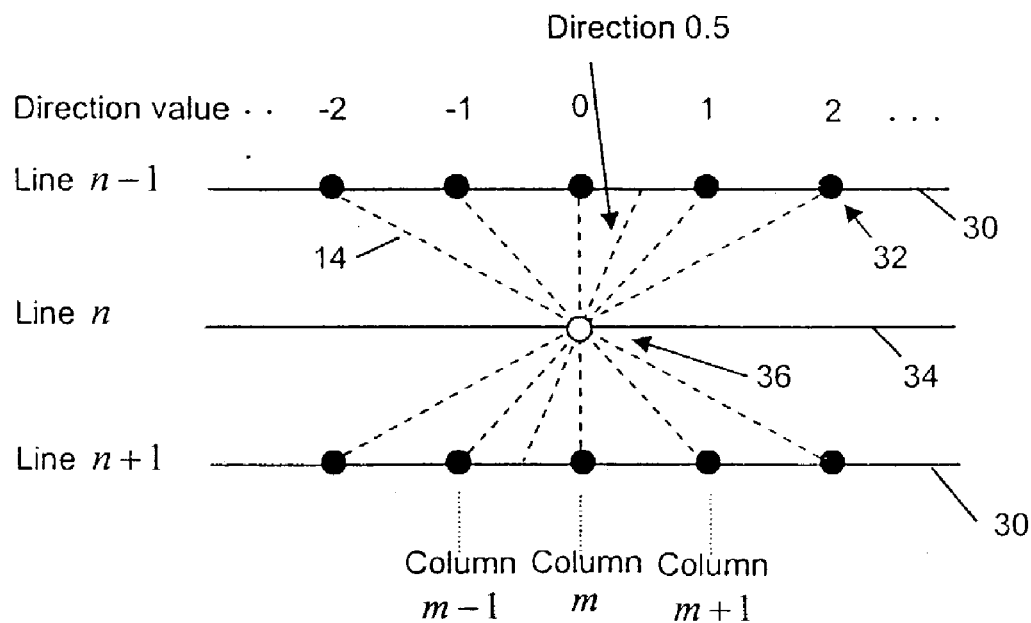
FIG. 4 shows an example numbering method for directions with different orientations, according to the present invention.
Figure 4:
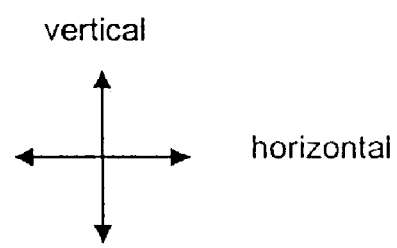

In this example, an edge direction is represented by assigning a different value to each direction orientation. Neighboring edge direction orientations are assigned with neighboring values. Such a direction numbering method is shown by example in FIG. 4 illustrating edge directions, wherein the vertical edge direction is assigned a value of zero. For a non-vertical edge direction, a value is associated with the number of pixels 32 shifted from the vertical direction on the upper row (i.e., Line n−1) or lower row (i.e., Line n+1) of the current pixel 36. For example, an edge direction connecting the pixel (n+1,m−1) and the pixel (n−1,m+1) is assigned a value of 1. An edge direction connecting the pixel (n+1,m+1) and the pixel (n−1,m−1) is assigned a value of −1. In general, an edge direction 14 connecting a pixel (n+1,m−i) and a pixel (n−1,m+i) is assigned a value of i, wherein i can be positive, negative, integer and non-integer value. FIG. 4 shows an edge direction with a value of 0.5 which connects the position (n+1, m−0.5) and the pixel at position (n−1,m+0.5).

Figure 5A:
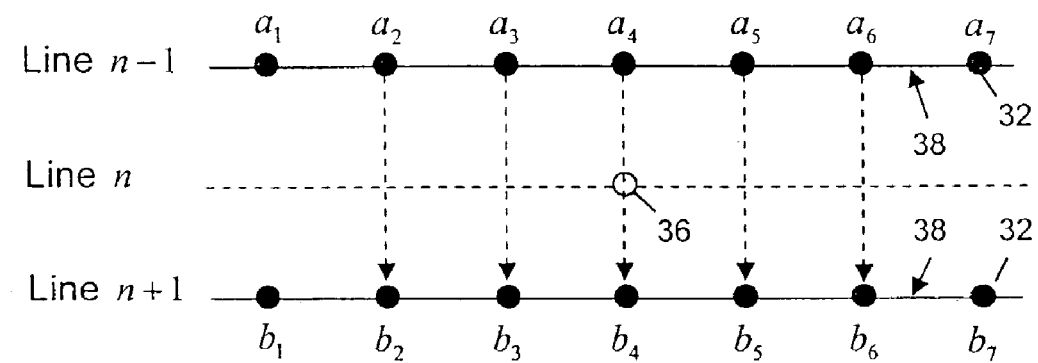
FIG. 5A and FIG. 5B show two examples of vectors and ways of checking vector correlations along different directions, according to the present invention.
Figure 5B:
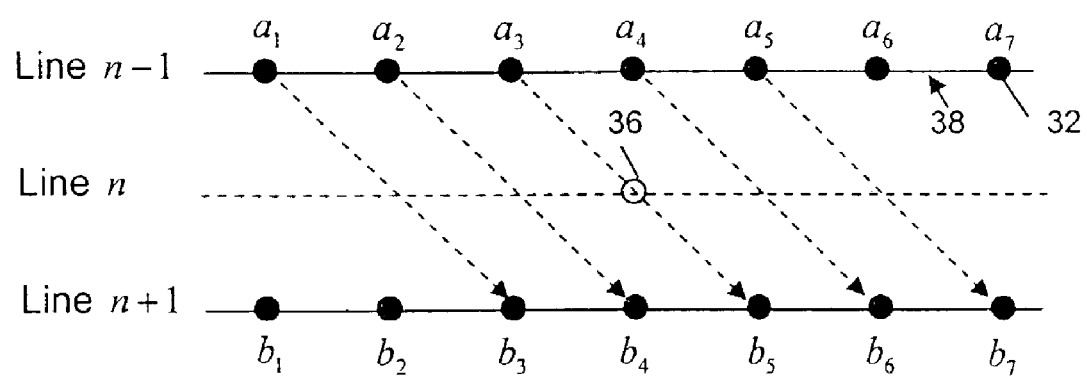

The edge detection method implemented by the edge direction detector 22 of FIG. 2 is based on checking vector correlations. Referring to FIG. 5A, an example vector 38 comprises a plurality of adjoining pixels from the pixels 32 of one of the two selected lines (i.e., Lines n−1 and n+1) and related to the selected pixel 36 for interpolation. In FIG. 5A, the hollow dot 36 denotes the selected pixel to be interpolated. The seven pixels 32 on scan Line n−1 have values of $a_1, a_2, \ldots, a_6$ and $a_7$, respectively, and the seven pixels 32 on Line n+1 have values of $b_1, b_2, \ldots, b_6$ and $b_7$, respectively. Assuming that the vector width is 5, then $(a_2,a_3,a_4,a_5,a_6)$ represents a first vector and $(b_2,b_3,b_4,b_5,b_6)$ represents a second vector. Checking the correlation between these two vectors indicates whether a non-vertical edge exists around the currently selected pixel 36. Likewise, as shown by example in FIG. 5B, checking the correlation between the vector $(a_1, a_2,a_3,a_4,a_5)$ and the vector $(b_3,b_4,b_5, b_6,b_7)$ indicates whether an edge with direction value of −1 exists around the current selected pixel 36. Similarly, vector correlations can be checked along other directions. The direction that provides the best vector correlation is likely to indicate the proper edge direction.

The edge directions detected between (e.g., at the center of) every two neighboring scan lines 30 in an interlaced scan constitute an edge orientation map (e.g., a table of edge direction entries stored in memory). Before the detected edge directions are used as the interpolation direction for interpolating the value of new pixels 36, a special edge direction filtering process is performed. Referring back to the system 20 of FIG. 2, the edge direction filter 24 performs such an edge direction filtering process. Through filtering, false or unreliable edge directions are removed from the edge orientation map. Once an edge direction is removed from the edge orientation map, it is replaced with a vertical edge direction. In this example, vertical direction is considered as the default interpolation direction for de-interlacing.

The example filtering process is based on the assumption that a valid edge should have a certain minimum length and a certain minimum width. Therefore, in an edge orientation map, correlations should exist among neighboring edge directions along an edge or across the edge.

Based on the assumption that a valid edge should have a certain minimum length, a filtering process can be performed by checking each direction along the direction it represents in the edge orientation map. In that case, neighboring directions along the edge should have similar orientations so that they can be considered as belonging to the same edge. If a direction cannot be extended to its neighboring directions in that manner, then the edge it represents is too short. In this case, the direction is not reliable for use in interpolation, and should be filtered out and replaced with vertical direction.

Similarly, based on the assumption that a valid edge should have a certain minimum width, a filtering process can be performed by checking each direction along the horizontal direction in the edge orientation map. In that case, neighboring edge directions in the same row in the edge orientation map should have similar orientations so that they can be considered as belonging to the same edge. If an edge direction does not have such neighboring edge directions with similar orientation, then the edge it represents is too thin. In this case, the edge direction is not reliable for interpolation and should be filtered out and replaced with vertical direction. Through such filtering processes, wrong or unreliable edge directions can be effectively removed from the edge orientation map while good/reliable edge directions are preserved. After the filtering process, the directions in edge orientation map are ready to be used for interpolation.

The directional interpolator 26 in FIG. 2 is designed to obtain good interpolation quality at a reasonable level of system complexity. Based on the edge direction at the position of the current pixel selected 36 to be interpolated, the interpolation can be classified based on one of the following three cases: (1) edge direction is vertical, (2) edge direction is non-vertical but has an integer direction value, and (3) edge direction is non-vertical and has a non-integer direction value.

In the first case (i.e., edge direction is vertical) interpolation is performed along the vertical direction. A simple interpolation involves taking the two samples 32 immediately above and below the current pixel 36 and averaging their values. For example, in FIG. 6 assume sample A at line n column m is the current pixel 36 to be interpolated and the edge direction at A is vertical. The luminance values at samples B and C are represented as I(n−1,m) and I(n+1,m), respectively. I(·,·) represents the luminance value in the current image frame. The interpolation in this case can be expressed as:

$$I(n,m)=(I(n-1,m)+I(n+1,m))/2 \quad (1)$$

Figure 6:
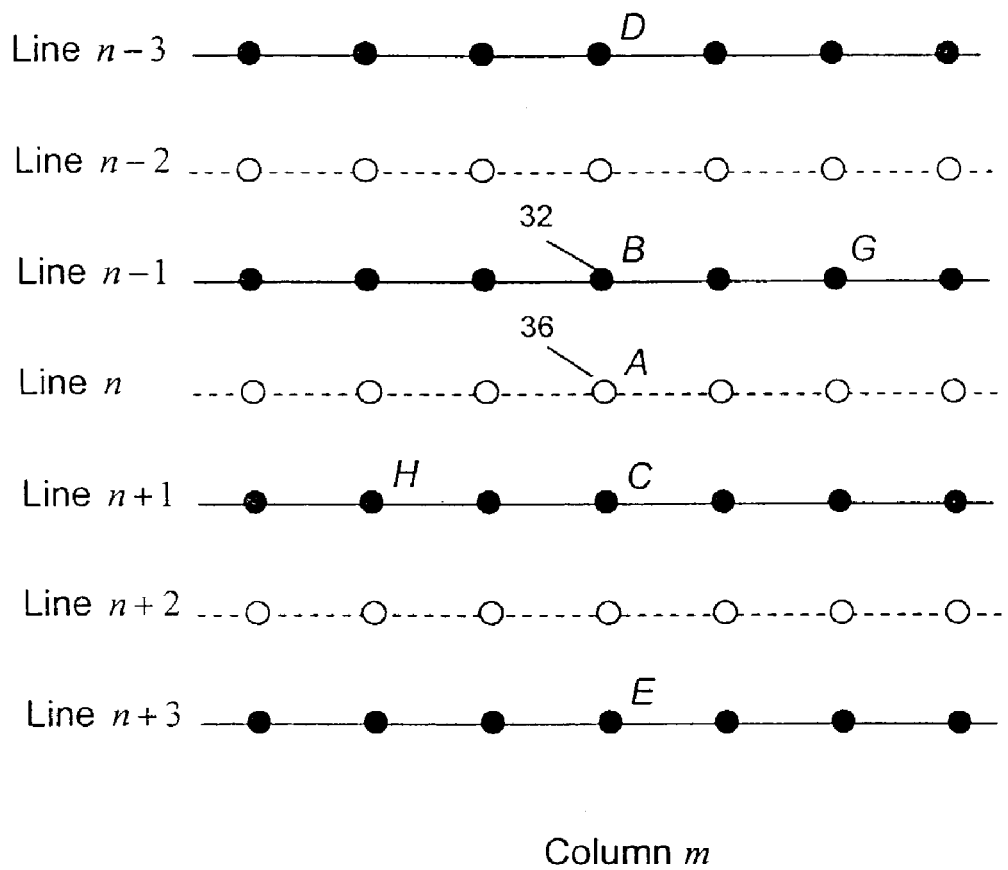
FIG. 6 shows an example of calculating the interpolation value for a new pixel for the case of vertical edge direction and the case of non-vertical edge direction with an integer direction value, according to the present invention.

However, the above averaging operation may smooth the image. Another method of interpolating is to utilize more samples along the vertical direction. As shown in FIG. 6, in addition to the samples B and C, the samples D and E can be used in interpolating the value for pixel A. In this case, a four tap FIR filter may be designed for the interpolation. An example four tap FIR filter used in this system 20 is represented as $\{-0.1, 0.6, 0.6, -0.1\}$. As such, in this case pixel A can be interpolated according to the relation (2) immediately below:

$$I(n,m)=-0.1*I(n-3,m)+0.6*I(n-1,m)+0.6*I(n+1,m)-0.1*I(n+3,m), \quad (2)$$

Figure 7:
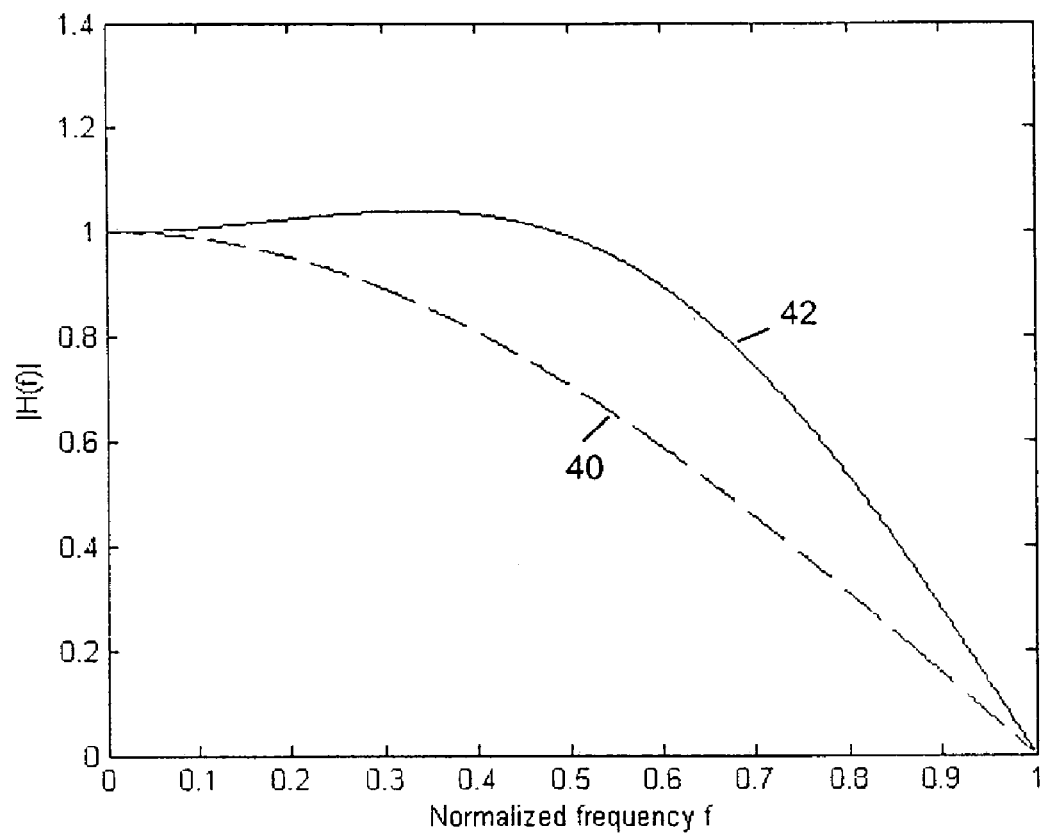
FIG. 7 shows the frequency response of an example 2 tap FIR filter and an example 4 tap FIR filter used for vertical interpolation, according to the present invention.

The averaging operation shown in relation (1) can be considered as a FIR filtering process using a two tap filter having coefficients $\{0.5, 0.5\}$. FIG. 7 shows a comparison of the frequency responses of the two FIR filters. In FIG. 7, the horizontal axis represents the normalized frequency f, and the vertical axis represents the amplitude of frequency transfer function H(f). The dashed curve 40 represents the frequency response of the two tap FIR filter and the solid curve 42 represents the frequency response of the four tap FIR filter. It can be seen that the four tap filter is better in keeping high frequency components. Therefore, the four tap filter does not smooth the image so much as the two tap filter.

When the edge direction is not vertical, preferably interpolation is performed along the edge direction. Referring back to FIG. 4, if an edge direction 14 value d is an integer, then the edge direction connects a sample 32 in the immediate upper Line n−1 and a corresponding sample 32 in the immediate lower Line n+1. Assuming that the direction for the current pixel 36 has an integer value of d, then that direction connects the sample at position (n−1,m+d) and the sample at position (n+1,m−d). As shown in FIG. 6, if the direction at pixel A has a value of 2, it connects the samples G and H. In this case, the interpolation value of pixel A is simply calculated as the average of the two samples G and H.

The interpolation is performed in a similar manner for all other integer value non-vertical edge directions by going along the edge direction of the current pixel, obtaining the corresponding sample in the immediate upper line and immediate lower line in the field, and then taking the average of those two sample values as the interpolation value for the current pixel. This operation can be expressed as:

$$I(n,m)=(I(n-1,m+d)+I(n+1,m-d))/2 \quad (3)$$

If a non-vertical edge direction has a non-integer value, then the direction does not connect any sample 32 in the immediate upper Line n−1 or immediate lower Line n+1. Instead, it goes between samples 32. Referring to the example in FIG. 8, an edge direction 14 with a value d=1.6 is shown at the position of pixel A. In this case, interpolation is performed in a directional bilinear method by first obtaining the four neighboring samples 32 designated as J, G, H and K along the edge direction in the immediate upper Line n−1 and immediate lower Line n+1, as shown. The four samples are located at positions (n−1,m+int(d)), (n−1,m+int(d)+sgn(d)), (n+1,m−int(d)) and (n+1,m−int(d)−sgn(d)). Here, "int" is a rounding function that rounds a value to the nearest integer towards zero. For example, int(1.7)=1, int(−2.5)=−2. Further, "sgn" is a sign function defined as:

$$\text{sgn}(x) = \begin{cases} 1 & \text{if } x > 0 \\ 0 & \text{if } x = 0 \\ -1 & \text{if } x < 0 \end{cases} \quad (4)$$

Figure 8:
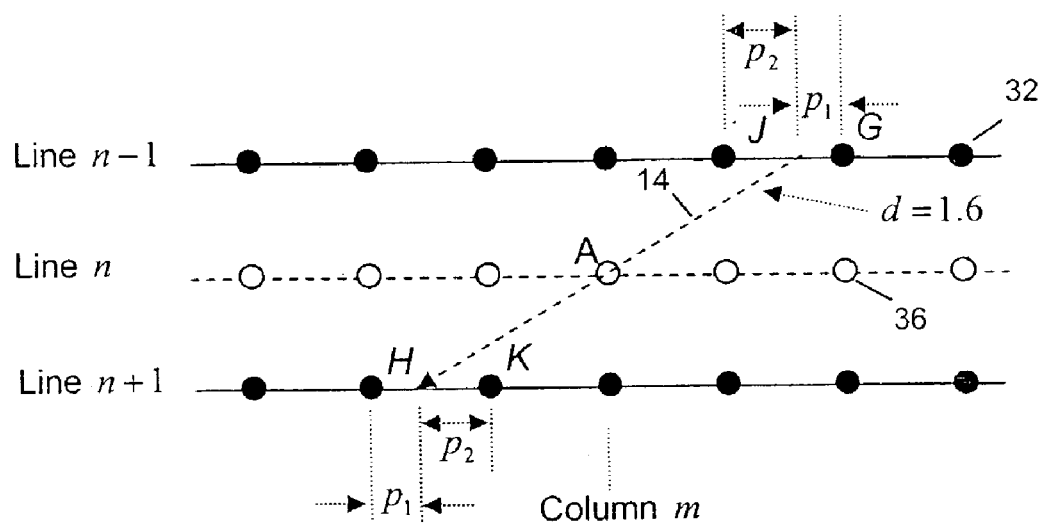
FIG. 8 shows an example of calculating interpolation value for a new pixel for the case of non-vertical edge direction with a non-integer direction value, according to the present invention.

In the example shown in FIG. 8, the four samples J, G, H and K are located at positions (n−1,m+int(1.6)), (n−1,m+int(1.6)+sgn(1.6)), (n+1,m−int(1.6)−sgn(1.6)) and (n+1,m−int(1.6)), respectively. After locating the four samples, the interpolation value for the current pixel is calculated as:

$$I(n,m)=\frac{1}{2}*(I(n-1,m+int(d))*p_1+I(n-1,m+int(d)+sgn(d))*P_2+I(n+1,m-int(d))*p_1+I(n+1,m-int(d)-sgn(d))*p_2), \quad (5)$$

wherein $p_1$ and $P_2$ are coefficients that are related to the direction value d for the current pixel 36, where d is a non-integer value in relation (5). In this case, $p_1$ and $P_2$ are determined as:

$$p_1=1-|d-int(d)| \quad (6)$$

$$p_2=|d-int(d)| \quad (7)$$

Assuming the distance between neighboring samples is 1, then $p_1$ and $P_2$ represent the length of the intervals shown in FIG. 8. As such, the interpolation according to relation (5) is similar to bilinear interpolation, but is performed along a direction d. This operation is referred to herein as directional bilinear interpolation.

As such, the present invention provides an improved method of image interpolation that detects edge directions between neighboring scan lines in an interlaced scan and interpolates an omitted line between two scan lines based on the edge directions. As noted, in one example such image interpolation for a selected pixel between two scan lines involves: (i) detecting edge directions at the selected pixel between two neighboring scan lines in an interlaced scan by checking vector correlations, (ii) filtering the detected edge directions to remove wrong or unreliable ones by checking correlations among neighboring directions in the edge orientation map, wherein checking is done both along the edge direction and across the direction such that if a direction is not well correlated with its neighboring directions, it is filtered out, and (iii) interpolating pixels of an omitted line at the center of two neighboring scan lines, wherein at each new pixel position, interpolation is done along the edge direction at that position which is detected and filtered in the above two steps.

Further, interpolation based on edge direction depending on the orientation and value of an edge direction. When the edge direction is vertical, interpolation is done along vertical direction using image samples in the same column as the selected pixel. Either a two tap FIR filter or a four tap FIR filter can be used to interpolate the value for the current pixel. When the edge direction is non-vertical but has an integer direction value, then interpolation is done along the edge direction using the two samples that are connected by the edge direction. The average of the two pixels is used as the interpolation value for the current pixel. When the edge direction is non-vertical and has a non-integer value, then the interpolation value for the selected pixel is calculated using four neighboring samples along the edge direction in a directional bilinear method.

Figure 9A:
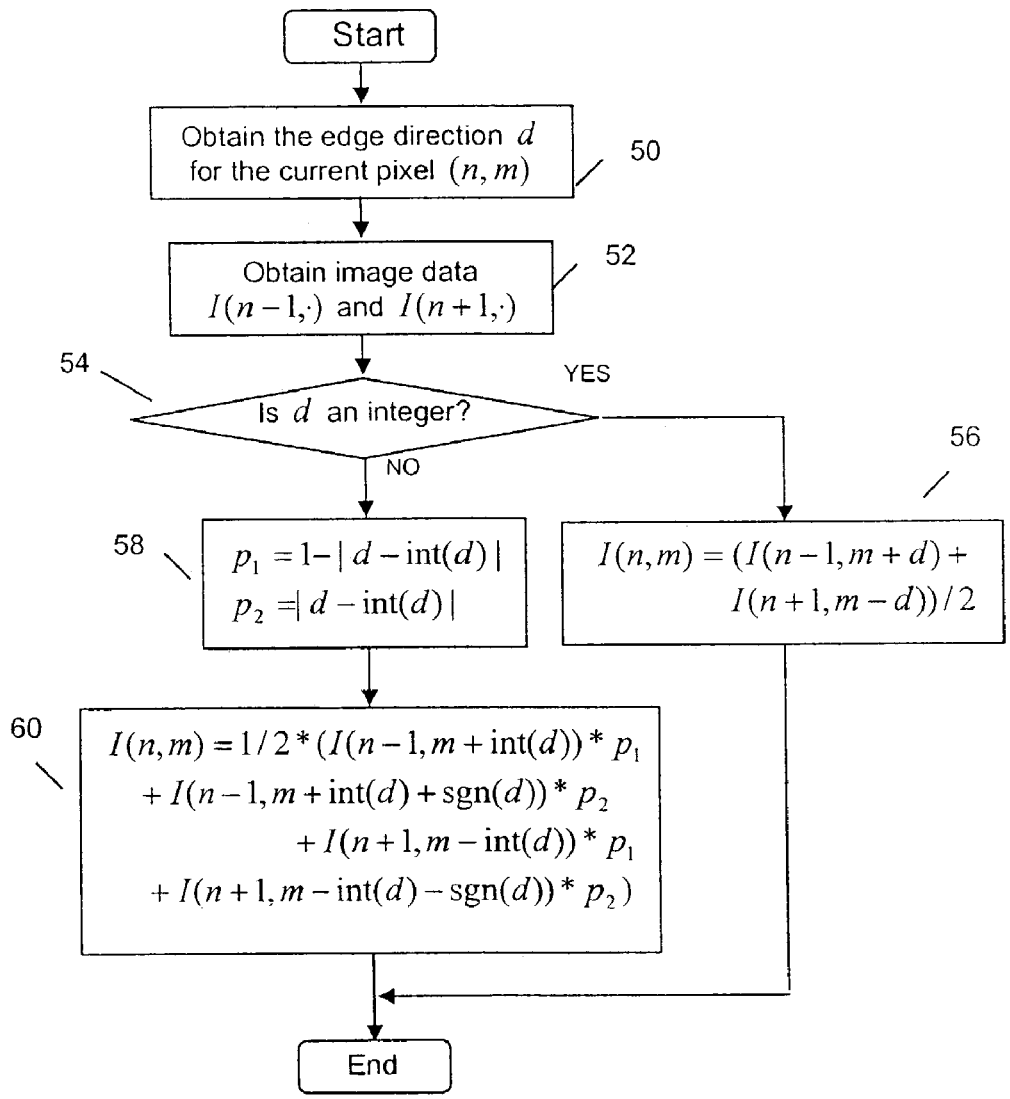
FIG. 9A and FIG. 9B show two flow charts of example interpolation processing in the directional interpolator of system of FIG. 2, according to the present invention.
Figure 9B:
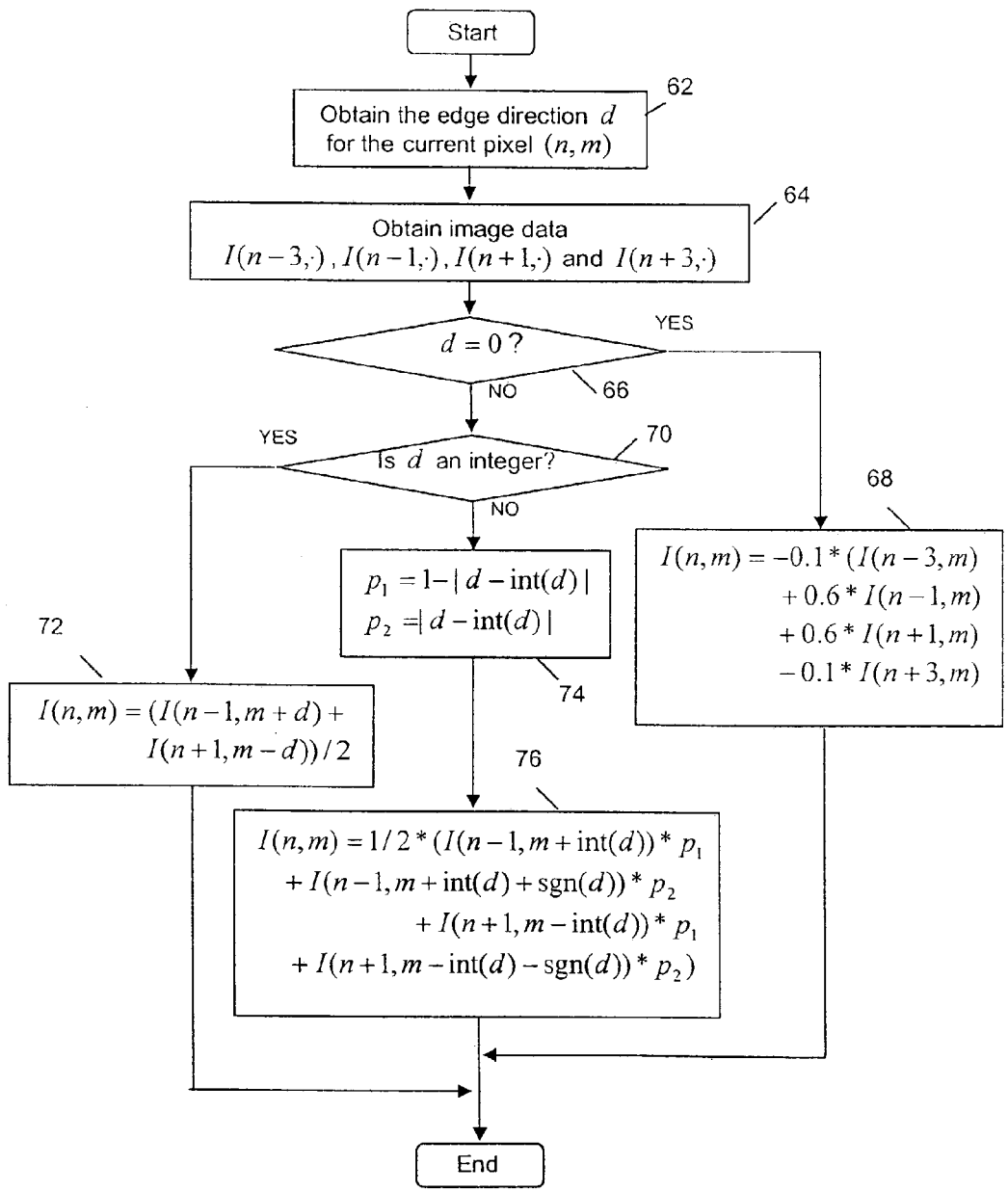

The flow charts in FIGS. 9A and 9B show steps of example processing by the directional interpolator of FIG. 2. The flowchart in FIG. 9A shows the process steps using a two tap FIR filter for vertical interpolation. When a two tap FIR filter is used for vertical interpolation, the processing is actually the same as that for non-vertical integer direction. Therefore, the two cases are combined together as one case in FIG. 9A. The flowchart in FIG. 9B shows the process steps using a four tap FIR filter for vertical interpolation.

The example interpolation process in FIG. 9A involves first determining the edge direction d, described above, for a pixel at position (n, m) to be interpolated (step 50). Then, the image data on the two scan lines neighboring to the current pixel is obtained (step 52). It is then determined if d is an integer (step 54). If d is an integer then an average value of the image data at the neighboring scan lines is determined according to relation (3) as the interpolated pixel value I(n, m) at position (n, m) (step 56). If d is not an integer, then interpolation is via a directional bilinear method by first determining the coefficients $p_1$ and $P_2$ according to relation (6) and (7) respectively (step 58), and then determining the pixel value I(n, m) according to relation (5) (step 60).

The example interpolation process in FIG. 9B involves first determining the edge direction d, described above, for a pixel at position (n, m) to be interpolated (step 62). Then image data on the four scan lines neighboring to the current pixel is obtained (step 64). Then a determination is made if d is zero (step 66). If d is essentially zero, then the pixel value I(n, m) at position (n, m) is interpolated according to relation (2) (step 68). If d is not zero then a determination is made if d is an integer (step 70). If d is an integer, then the pixel value I(n, m) at position (n, m) is interpolated according to relation (3) (step 72). However, if d is not zero and is a non-integer then the pixel value I(n, m) at position (n, m) is determined using a directional bilinear method by first determining the coefficients p, and P2 according to relations (6) and (7), respectively (step 74), and then determining the pixel value I(n, m) according to relation (5) (step 76).

As such, the present invention provides an edge direction-based image interpolation method that effectively detects and utilizes edge direction information without introducing obvious artifacts in the interpolated image.

The aforementioned apparatus/system 20 according to the present invention, can be implemented as program instructions for execution by a processor, as logic circuits, as ASIC, as firmware, etc., as is known to those skilled in the art. Therefore, the present invention is not limited to the example embodiments described herein.

The present invention has been described in considerable detail with reference to certain preferred versions thereof; however, other versions are possible. Therefore, the spirit and scope of the appended claims should not be limited to the description of the preferred versions contained herein.

What is claimed is:

1. A method for interpolating a pixel in an image, the pixel being selected among pixels constituting a first line between two lines neighboring the first line, the method comprising the steps of:
   detecting edge directions between the two lines;
   removing faulty detected edge directions from an edge orientation map by checking correlations among neighboring detected edge directions; and
   interpolating the selected pixel between the two lines using a plurality of pixel values comprising pixels from the two lines along the detected edge directions, wherein the step of interpolating based on edge direction further includes the steps of:
   (i) determining orientation of the edge directions as essentially vertical or non-vertical;
   (ii) if an edge direction is vertical, then interpolating the selected pixel along the vertical direction using image pixels in the same column as the selected pixel;
   (iii) if an edge direction is non-vertical but has an integer direction value, then interpolating the selected pixel along the edge direction using at least two image pixels that are connected by the edge direction; and
   (iv) if the edge direction is non-vertical and has a non-integer value, then interpolating the selected pixel along the edge direction using neighboring samples along the edge direction in a directional bilinear method.

2. The method of claim 1, wherein interpolating the selected pixel value is performed using a two tap FIR filter.

3. The method of claim 2, wherein in step (ii) interpolating the selected pixel value is performed using a two tap FIR filter implementing the relation:

$$I(n,m)=(I(n-1,m)+I(n+1,m))/2,$$

wherein $I(\cdot,\cdot)$ is the luminance value, (n,m) is the position of the selected pixel in the image, and (n−1,m) and (n+1,m) are two pixel positions that are immediately above and below the selected pixel in a column.

4. The method of claim 1, wherein interpolating the selected pixel value is performed using a four tap FIR filter.

5. The method of claim 4, wherein in step (ii) interpolating the selected pixel value is performed using a four tap FIR filter implementing the relation:

$$I(n,m)=-0.1*I(n-3,m)+0.6*I(n+1,m)+0.6*I(n+1,m)-0.1*I(n+3,m)$$

wherein $I(\cdot,\cdot)$ is the luminance value, and (n,m) is the position of the selected pixel in the image.

6. The method of claim 1, wherein in step (iii) interpolating the selected pixel further includes the steps of averaging the value of two image pixels connected by the edge direction, and using the average value as the interpolated value for the selected pixel.

7. The method of claim 1, wherein in step (iii) interpolating is performed according to the relation:

$$I(n,m)=(I(n-1,m+d)+I(n+1,m-d))/2$$

wherein $I(\cdot,\cdot)$ is the luminance value, (n,m) is the position of the selected pixel in the image and d is the direction value for the selected pixel.

8. The method of claim 1, wherein in step (iv) an interpolated value for the selected pixel is determined using four neighboring samples along the edge direction in a directional bilinear method.

9. The method of claim 1, wherein in step (iv) interpolating in a directional bilinear method is performed according to the relation:

$$I(n,m)=\tfrac{1}{2}*(I(n-1,m+\text{int}(d))*p_1 I(n-1,m+\text{int}(d)+\text{sgn}(d))*p_2+$$

$$I(n+1,m-\text{int}(d))*p_1+I(n+1,m-\text{int}(d)-\text{sgn}(d))*p_2),$$

wherein $I(\cdot,\cdot)$ is the luminance value, (n,m) is the position of the selected pixel in the image, d is the direction value for the selected pixel, "int" is a rounding function that rounds a value to the nearest integer towards zero, "sgn" is a sign function, and $p_1$ and $p_2$ are coefficients that are related to the direction value d of the selected pixel, wherein:

$$p_1=1-|d-\text{int}(d)|,$$

$$p_2=|d-\text{int}(d)|.$$

10. An image interpolation system for interpolating a pixel in an image, the pixel being selected among pixels constituting a first line between two lines neighboring the first line, the system comprising:
an edge detector that detects edge directions between the two lines;
an edge direction filter that removes faulty detected edge directions from an edge orientation map by checking correlations among neighboring detected edge directions; and
a directional interpolator that interpolates the selected pixel between the two lines using a plurality of pixel values comprising pixels from the two lines along the detected edge directions, wherein the directional interpolator is further configured such that:
if an edge direction is vertical, then the directional interpolator interpolates the selected pixel along the vertical direction using image pixels in the same column as the selected pixel;
if an edge direction is non-vertical but has an integer direction value, then the directional interpolator interpolates the selected pixel along the edge direction using at least two image pixels that are connected by the edge direction; and
if the edge direction is non-vertical and has a non-integer value, then the directional interpolator interpolates the selected pixel along the edge direction using neighboring samples along the edge direction in a directional bilinear method.

11. The system of claim 10, wherein the directional interpolator comprises a two tap FIR filter.

12. The system of claim 11, wherein the directional interpolator is further configured such that, if an edge direction is vertical, then the directional interpolator interpolates the selected pixel value using the two tap FIR filter implementing the relation:

$$I(n,m)=(I(n-1,m)+I(n+1,m))/2$$

wherein $I(\cdot,\cdot)$ is the luminance value, (n,m) is the position of the selected pixel in the image, and (n−,m) and (n+1,m) are two pixel positions that are immediately above and below the selected pixel in a column.

13. The system of claim 10, wherein the directional interpolator comprises a four tap FIR filter.

14. The system of claim 13, wherein the directional interpolator is further configured such that, if an edge direction is vertical then the directional interpolator interpolates the selected pixel value using the four tap FIR filter implementing the relation:

$$I(n,m)=0.1*I(n-3,m)+0.6*I(n-1,m)+0.6*I(n+1,m)-0.1*I(n+3,m)$$

wherein $I(\cdot,\cdot)$ is the luminance value, and (n,m) is the position of the selected pixel in the image.

15. The system of claim 10, wherein the directional interpolator is further configured such that, if an edge direction in non-vertical but has an integer direction value, then the directional interpolator interpolates the selected pixel value by averaging the value of two image pixels connected by the edge direction, and using the average value as the interpolated value for the selected pixel.

16. The system of claim 10, wherein the directional interpolator is further configured such that, if an edge direction is non-vertical but has an integer direction value, then the directional interpolator interpolates the selected pixel value according to the relation:

$$I(n,m)=(I(n-1,m+d)+I(n+1,m-d))/2$$

wherein $I(\cdot,\cdot)$ is the luminance value, (n,m) is the position of the selected pixel in the image and d is the direction value for the selected pixel.

17. The system of claim 10, wherein the directional interpolator is further configured such that, if the edge direction is non-vertical and has a non-integer value, then the directional interpolator interpolates the selected pixel value using four neighboring samples along the edge direction in a directional bilinear method.

18. The system of claim 10, wherein the directional interpolator is further configured such that, if the edge direction is non-vertical and has a non-integer value, then the directional interpolator interpolates the selected pixel value according to the relation:

$$I(n,m)=\tfrac{1}{2}*(I(n-1,m+\text{int}(d))*p_1+I(n-1,m+\text{int}(d)+\text{sgn}(d))*p_2+$$

$$I(n+1,m-\text{int}(d))*p_1+I(n+1,m-\text{int}(d))*p_2),$$

wherein $I(\cdot,\cdot)$ is the luminance value, (n,m) is the position of the selected pixel in the image, d is the direction value for the selected pixel, "int" is a rounding function that rounds a value to the nearest integer towards zero, "sgn" is a sign function, and $p_1$ and $p_2$ are coefficients that are related to the direction value d of the selected pixel, wherein:

$$p_1=1-|d-\text{int}(d)|,$$

$$p_2=|d-\text{int}(d)|.$$

* * * * *